United States Patent [19]

Soyland

[11] 4,049,070

[45] Sept. 20, 1977

[54] EXCAVATOR HAVING LIFTING LEGS AND COOPERATING BOOM MOUNTED BUCKET FOR "WALKING"

[76] Inventor: Ingebret Soyland, Solhogda 2 Brynehaugen, Bryne, Norway, N-4340

[21] Appl. No.: 597,228

[22] Filed: July 18, 1975

[30] Foreign Application Priority Data

July 19, 1974 Norway .................................. 742642

[51] Int. Cl.² .............................................. B62D 57/00

[52] U.S. Cl. ...................................... 180/8 C; 37/103; 214/138 R

[58] Field of Search ................. 37/1, 103; 212/28, 38, 212/48, 49, 145; 214/138, 131 R, 138 R, 142; 280/763, 764, 765, 766; 180/8 R, 8 A, 8 B, 8 BA, 8 C

[56] References Cited

U.S. PATENT DOCUMENTS

| | | | |
|---|---|---|---|
| 1,715,745 | 6/1929 | Edmondson | 180/8 C |
| 2,897,986 | 8/1959 | Davis | 37/103 X |
| 3,425,572 | 2/1969 | Brach | 214/138 R X |
| 3,545,627 | 12/1970 | LeTourneau | 212/145 X |
| 3,608,756 | 9/1971 | Guinot | 214/138 |
| 3,625,381 | 12/1971 | Menzi | 214/138 |
| 3,747,718 | 7/1973 | Gauchet | 37/103 X |
| 3,777,898 | 12/1973 | Gallay | 212/38 |
| 3,918,742 | 11/1975 | Gaibler et al. | 280/764 |

FOREIGN PATENT DOCUMENTS

| | | | |
|---|---|---|---|
| 678,066 | 1/1964 | Canada | 37/80 R |
| 1,165,944 | 10/1969 | United Kingdom | 214/131 |

*Primary Examiner*—Edgar S. Burr
*Assistant Examiner*—Steven A. Bratlie
*Attorney, Agent, or Firm*—John J. Dennemeyer

[57] ABSTRACT

An excavator has its cabin and boom mounted bucket on a rail carriage which may be moved along the excavator frame by means of a first set of hydraulic cylinders. Lifting legs are mounted on the sides of the rail carriage and are associated with a second set of hydraulic cylinders for lifting the under-frame in cooperation with the bucket. The lifting legs and bucket form a 3-point stance when pressed against the ground. In this stance the under-frame may be translated by said first set of hydraulic cylinders and/or turned relative to the upper-frame by motor means. This arrangement allows the excavator to "walk" out of difficult situations.

3 Claims, 4 Drawing Figures

EXCAVATOR HAVING LIFTING LEGS AND COOPERATING BOOM MOUNTED BUCKET FOR "WALKING"

The present invention relates to an excavator which comprises a boom that is pivotable in the vertical and horizontal plane and an upper frame which can be rotated together with the boom by means of a motor drive in the horizontal plane relative to the under-frame to which wheels or crawlers are mounted.

The boom and cabin are mounted on a rail carriage which can be moved relative to the upper frame of the excavator by means of hydraulic cylinders.

It is a known matter that the conventional excavators have limited moving possibilities in difficult terrain, even if the boom can be used for lifting, turning, pushing and pulling the excavator.

It is therefore an object of the invention to provide an excavator of the type mentioned above which has greater moving possibilities in difficult terrain than the known excavators.

According to the invention this object is attained in that a lifting leg is mounted to each side of the rail carriage and controlled by means of hydraulic cylinders. The legs can be pressed against the ground at the same time as the bucket on the boom is pressed against the ground, so that the wheels or crawlers of the excavator are lifted from the ground and can be moved by means of the hydraulic cylinders moving the rail carriage relative to the upper frame of the excavator, as well as by turning the under frame relative to the upper frame.

A preferred embodiment of the invention will now be described by way of example with reference to the accompanying drawings in which:

FIG. 1 is a side view of an excavator according to the invention. FIG. 2 is a top view of the excavator with both lifting legs in the lowered position. The cabin is not shown in this Figure.

Figure 1:
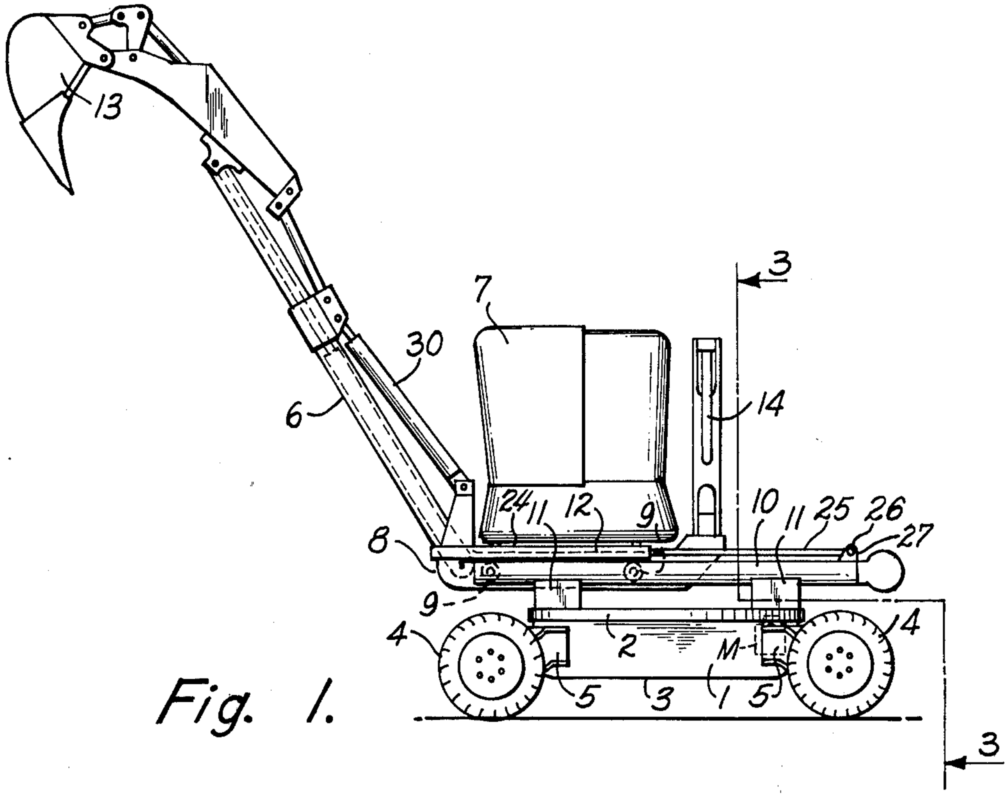
Figure 2:
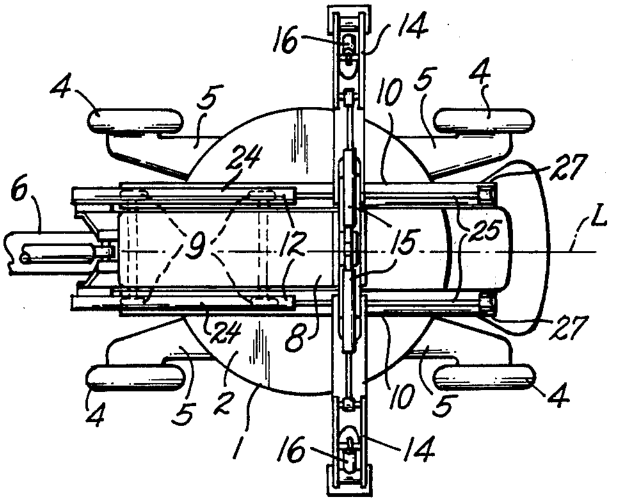

Referring now to the drawings, reference numeral 1 designates the excavator under-frame which is formed like a big cylindrical vessel. The upper frame 2 of the excavator is rotatably movable by a drive motor M, arranged in a known manner relative to the under-frame 1. In order to prevent the excavator from sinking deeply into soft ground, the bottom 3 of the under-frame 1 is formed like a big support plate. The wheels 4 of the excavator are mounted on brackets 5 fastened to the under-frame 1.

The boom 6 as well as the cabin 7 are mounted on a rail carriage 8. The wheels 9 of the rail carriage 8 fit inside C-shaped rails 10 which are mounted to brackets 11 fastened to the upper frame 2. The length of the rails 10 is somewhat greater than the distance of wheels between the wheels 4 of the excavator. The rail carriage 8 can be moved longitudinally on the rails 10 along the longitudinal axis 1 thereof by means of two hydraulic cylinders 12. As is shown in the drawings, the two hydraulic cylinders 12 each include a cylinder 24 and a piston 25, the outer ends of the pistons 25 being connected by pins 26 to brackets 27 provided on the ends of the rails 10. The cylinders 24 are of course connected to the rail carriage 8, whereby operation of the hydraulic cylinders 12 will effect relative movement between the rail carriage 8 and the rails 10. The boom 6 is provided in known manner with a bucket 13, and is operated by a hydraulic cylinder 30. The cabin 7 is mounted on the rail carriage 8 close behind the boom 6 in order to obtain the best view from the cabin 7 in all directions.

A lifting leg 14 is mounted on each side of the rail carriage 8 and is controlled by means of hydraulic cylinders 15, 16. The legs can be pressed against the ground by operating the hydraulic cylinders 15 and 16, at the same time as the bucket 13 on the boom 6 is pressed against the ground, by operating the hydraulic cylinder 30, so that the wheels 4 of the excavator are lifted from the ground and can be moved by means of the hydraulic cylinders 12 moving the rail carriage 8 relative to the upper frame 2 of the excavator, as well as by turning the under frame 1 relative to the upper frame 2.

Figure 3:
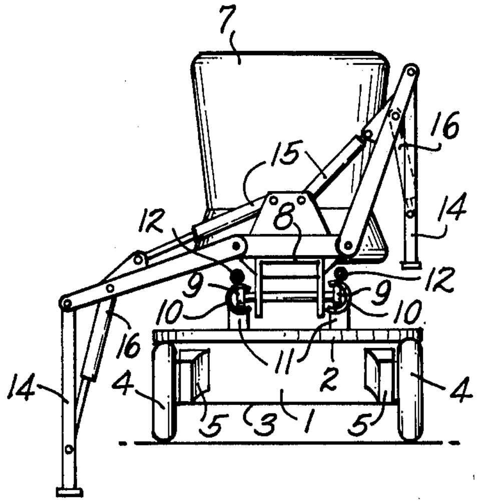
FIG. 3 shows a sectional view of the excavator along a line 3—3 of FIG. 1, and with one lifting leg in the elevated position and one lifting leg in the lowered position. The boom is not shown in this Figure.
Figure 4:
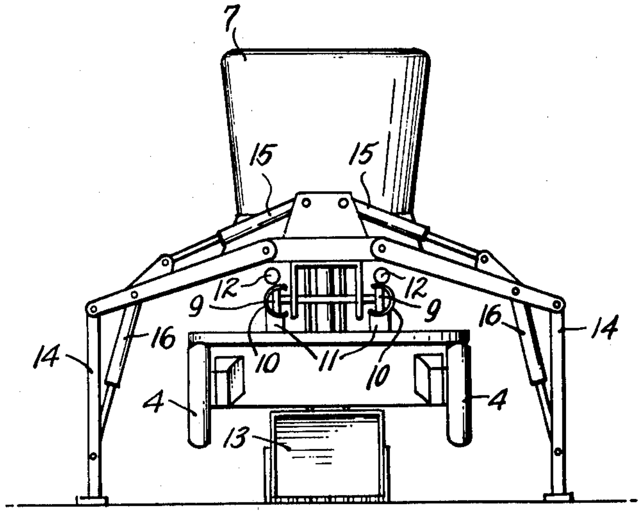
FIG. 4 is a diagrammatic view showing the excavator in end elevational view, with the two lifting legs and the bucket on the boom all engaging the ground, and with the excavator wheels lifted from the ground to allow for relative translational movement between the rail carriage and the upper frame of the excavator.

To more fully explain the operation of the invention, reference is made to FIGS. 1, 3 and 4. The hydraulic cylinders 15 and 16 are operated to move the legs 14 into engagement with the ground, as shown in FIGS. 3 and 4. Then, the hydraulic cylinder 30 is operated to engage the bucket 13 with the ground. All of the hydraulic cylinders 15, 16 and 30 are then further operated, resulting in lifting of the under frame 1 by a three-point hoisting arrangement until the wheels 4 are free of the ground, as best shown in FIG. 4. The drive motor M can then be operated, if desired, to reposition the wheels 4, and/or the hydraulic cylinders 12 can be operated to translate the under frame 1 relative to the now stationary rail carriage 8. When the wheels 4 have been repositioned as desired, the hydraulic cylinders 14, 15 and 30 are all operated to return the excavator to its operative, ground engaging position. The boom 6 and bucket 13 then cease to be a part of the three-point lifting apparatus, and are again used in a normal manner.

What is claimed is:

1. an excavator, comprising:

frame means having wheel means thereon;

rail means mounted on said frame means;

a rail carriage mounted on said rail means, and movable along the longitudinal axis thereof;

first motive means connected between said rail carriage and said rail means, operable to effect movement of said rail carriage along the longitudinal axis of said rail means;

a boom and bucket assembly carried by said rail carriage, and including a second motive means operable separate from said first motive means to move said boom and bucket in a generally vertical plane to engage said bucket with the earth, said generally vertical plane including the longitudinal axis of said rail means; and a lifting leg assembly mounted on each of the opposite sides of said rail carriage to project laterally from the longitudinal axis thereof, each of said lifting leg assemblies including a third motive means operable separate from said first and said second motive means to press the lower end of the associated leg assembly against the ground, said third motive means of said lifting leg assemblies and said second motive means of said boom and bucket assembly being operable separately but co-operatively to engage all three of said bucket and said laterally projecting leg assemblies with the ground to lift said wheel means on said frame means to a height spaced above the ground, whereupon said first motive means connected between said rail carriage and said rail means can be operated separately to move said frame means relative to said rail carriage to thereby move said wheel means to a different location.

2. An excavator as recited in claim 1, wherein said frame means comprises:

an under frame having said wheel means thereon;

an upper frame rotatably mounted on said under frame, said rail means being mounted on said upper frame; and motor drive means connected with said under frame and said upper frame, and operable to effect rotation of said upper frame relative to said under frame.

3. An excavator as recited in claim 2, including additionally: a cabin mounted on said rail carriage.

* * * * *